United States Patent
Kempeneers et al.

(10) Patent No.: US 10,935,135 B2
(45) Date of Patent: Mar. 2, 2021

(54) MULTI-COMPONENT SEAL AND ENCLOSURE

(71) Applicant: COMMSCOPE CONNECTIVITY BELGIUM BVBA, Kessel-Lo (BE)

(72) Inventors: Dirk Kempeneers, Aarschot (BE); Bart Mattie Claessens, Hasselt (BE); Emilie De Groe, Kessel-Lo (BE); Erwin Beckers, Werchter (BE); Frank De Blick, Tielt-Winge (BE); Robert Vanhentenrijk, Winksele (BE); Amandus Pieck, Kortenaken (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 103 days.

(21) Appl. No.: 16/090,527

(22) PCT Filed: Mar. 29, 2017

(86) PCT No.: PCT/EP2017/057445
§ 371 (c)(1),
(2) Date: Oct. 1, 2018

(87) PCT Pub. No.: WO2017/167819
PCT Pub. Date: Oct. 5, 2017

(65) Prior Publication Data
US 2019/0120380 A1    Apr. 25, 2019

Related U.S. Application Data

(60) Provisional application No. 62/317,266, filed on Apr. 1, 2016.

(51) Int. Cl.
*F16J 15/02* (2006.01)
*H02G 3/08* (2006.01)
*G02B 6/44* (2006.01)

(52) U.S. Cl.
CPC .......... *F16J 15/022* (2013.01); *G02B 6/4444* (2013.01); *H02G 3/088* (2013.01)

(58) Field of Classification Search
CPC .......... H02G 3/088; H02G 3/08; H02G 3/083; H02G 15/013; F16J 15/022; G02B 6/4444
See application file for complete search history.

(56) References Cited

U.S. PATENT DOCUMENTS 5,825,961 A    10/1998    Wilkins et al.
6,118,076 A *  9/2000    Damm ................. H02G 15/113
                                                174/77 R (Continued)

FOREIGN PATENT DOCUMENTS

CN    1338138 A    2/2002
CN    1199060 C    4/2005

(Continued)

OTHER PUBLICATIONS

Chinese Office Action for corresponding Chinese Patent Application No. 201780018389.4 dated Oct. 21, 2019, 15 pages.

(Continued)

*Primary Examiner* — Timothy J Thompson
*Assistant Examiner* — Amol H Patel
(74) *Attorney, Agent, or Firm* — Merchant & Gould P.C.

(57) ABSTRACT

A seal (110) for a telecommunications enclosure (100) includes a first body (114) made of a first material. The first body (114) defines a port (112) and the port (112) defines a port axis (113). The first body (114) further includes a first axial face (122), an opposite second axial face (124), and a peripheral surface (126). The peripheral surface (126) surrounds the first body (114) between the first axial face (122) and second axial face (124), and the peripheral surface (126) further surrounds the port. The seal (110) also includes a second body (116) made of a second material. The second (Continued)

body (116) is disposed on at least the peripheral surface (126) of the first body (114). The second material is softer than the first material of the first body (114).

23 Claims, 12 Drawing Sheets

(56) References Cited

U.S. PATENT DOCUMENTS

| | | |
|---|---|---|
| 2006/0247359 A1 | 11/2006 | Dower |
| 2007/0007038 A1 | 1/2007 | Cox et al. |
| 2007/0045003 A1 | 3/2007 | Cairns |
| 2014/0314387 A1 | 10/2014 | Massuda |
| 2015/0222107 A1 | 8/2015 | Jackson |
| 2015/0345668 A1 | 12/2015 | Blaser et al. |

FOREIGN PATENT DOCUMENTS

| | | |
|---|---|---|
| CN | 201417927 Y | 3/2010 |
| CN | 101874216 A | 10/2010 |
| DE | 20 2007 014 971 U1 | 12/2007 |
| EP | 0 442 941 B1 | 1/1995 |
| EP | 0 883 006 A2 | 12/1998 |
| EP | 0 942 303 A1 | 9/1999 |
| EP | 1 970 737 A1 | 9/2008 |
| EP | 2 330 706 A1 | 6/2011 |
| EP | 2 557 443 A1 | 2/2013 |
| JP | 3560090 B2 | 9/2004 |
| WO | 95/24756 A1 | 9/1995 |
| WO | 96/26566 A1 | 8/1996 |
| WO | 97/02637 A1 | 1/1997 |
| WO | 2007/118548 A1 | 10/2007 |
| WO | 2007/137717 A1 | 12/2007 |
| WO | 2009/148604 A2 | 12/2009 |
| WO | 2014/005916 A2 | 1/2014 |
| WO | 2014/005918 A2 | 1/2014 |
| WO | 2015/028428 A1 | 3/2015 |
| WO | 2015/090907 A1 | 6/2015 |
| WO | 2015/120901 A1 | 8/2015 |

OTHER PUBLICATIONS

International Search Report and Written Opinion of the International Searching Authority for International Patent Application No. PCT/EP2017/057445 dated Jul. 6, 2017, 13 pages.

* cited by examiner

MULTI-COMPONENT SEAL AND ENCLOSURE

CROSS REFERENCE TO RELATED APPLICATION

This application is a National Stage Application of PCT/EP2017/057445, filed on Mar. 29, 2017, which claims the benefit of U.S. Patent Application Ser. No. 62/317,266, filed on Apr. 1, 2016, the disclosures of which are incorporated herein by reference in their entireties. To the extent appropriate, a claim of priority is made to each of the above disclosed applications.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters, and wavelength division multiplexers. It is often preferred for the telecommunications enclosures to be re-enterable. The term "re-enterable" means that the telecommunications enclosures can be re-opened to allow access to the telecommunications components housed therein without requiring the removal and destruction of the telecommunications enclosures. For example, certain telecommunications enclosures can include separate access panels that can be opened to access the interiors of the enclosures and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, wedges, or other structures. Telecommunications enclosures are typically sealed to inhibit the intrusion of moisture or other contaminants. Improvements in seal design are desired.

SUMMARY

The present disclosure relates generally to an enclosure sealing unit. In one possible configuration, and by non-limiting example, the sealing unit includes a first and second body, where the second body is disposed on the first body and is softer than the first body.

In one aspect of the present disclosure, a seal for a telecommunications enclosure is disclosed. The seal includes a first body made of a first material. The first body defines a port and the port defines a port axis. The first body further includes a first axial face, an opposite second axial face, and a peripheral surface. The peripheral surface surrounds the first body between the first axial face and second axial face and the peripheral surface further surrounds the port. The seal also includes a second body made of a second material. The second body is disposed on at least the peripheral surface of the first body. The second material is softer than the first material of the first body.

In another aspect of the present disclosure, a seal for a telecommunications enclosure is disclosed. The seal includes a main body having flat top surface, generally flat side surfaces, and an arcuate shaped bottom surface. The main body is comprised of a first material. The seal includes at least one port passing through the main body. The port has tapered walls. The port also includes a first seam in the main body that connects the port to a single side surface of the main body. The first seam is movable between an open position and a closed position. When in the open position, the first seam allows lateral access to the port. The seal includes a second body comprised of a second material where the second material is softer than the first material. The second body is disposed on the top, bottom, and side surface of the main body. The second body is also deposited on the tapered walls of the port.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
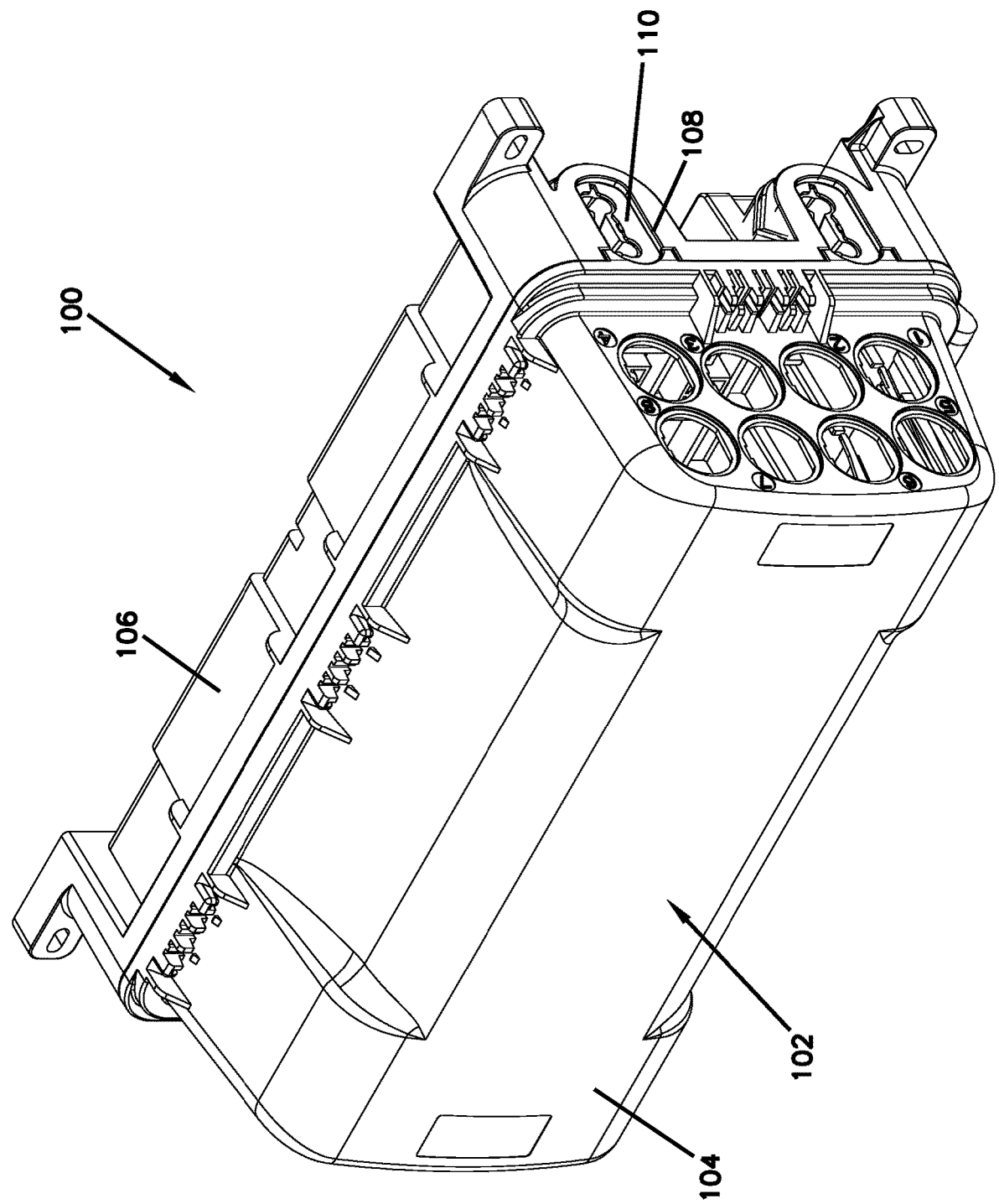
FIG. 1 illustrates a perspective view of an example enclosure according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
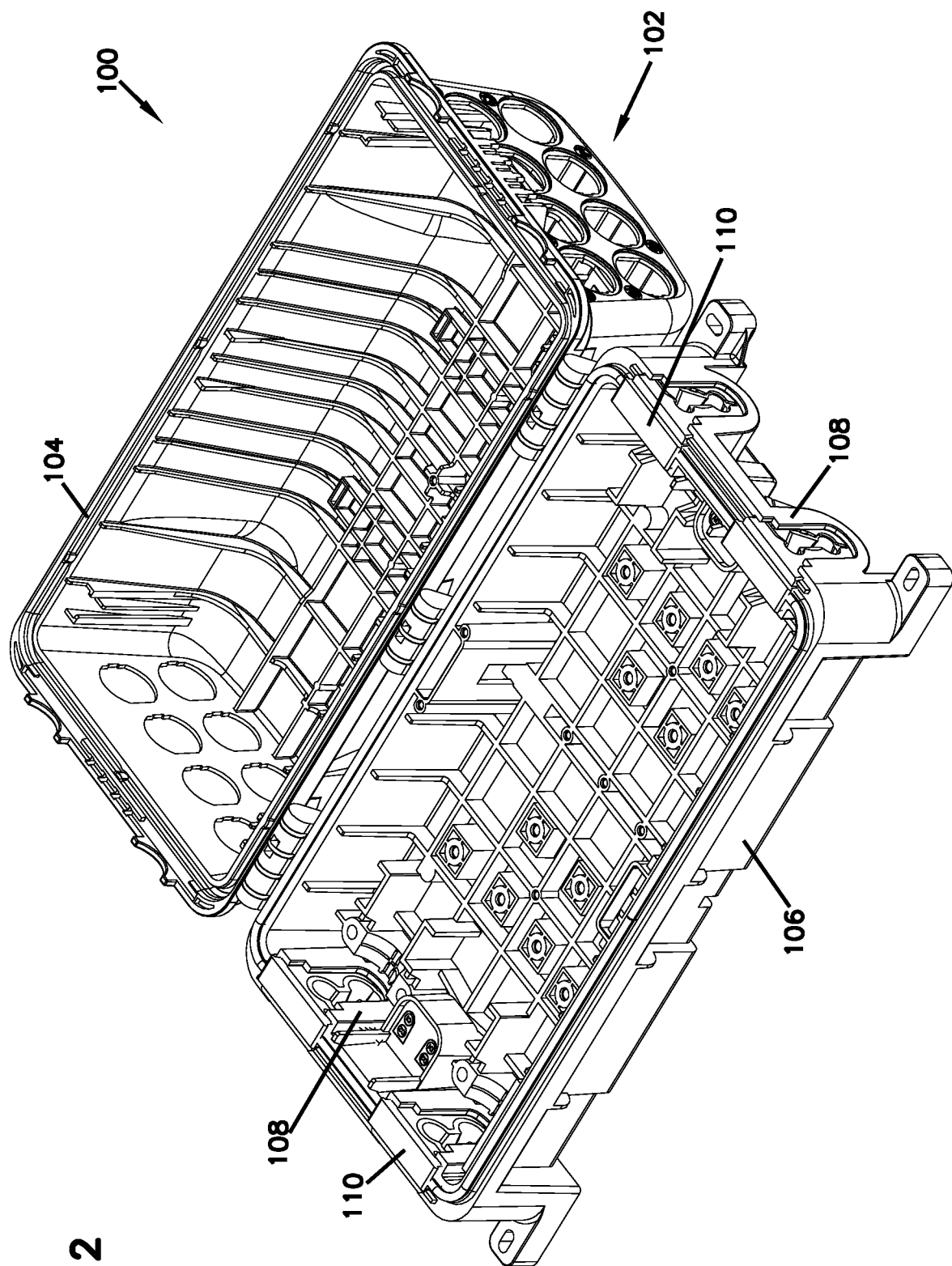
FIG. 2 illustrates a perspective view of the enclosure FIG. 1 in an open position.
Figure 3:
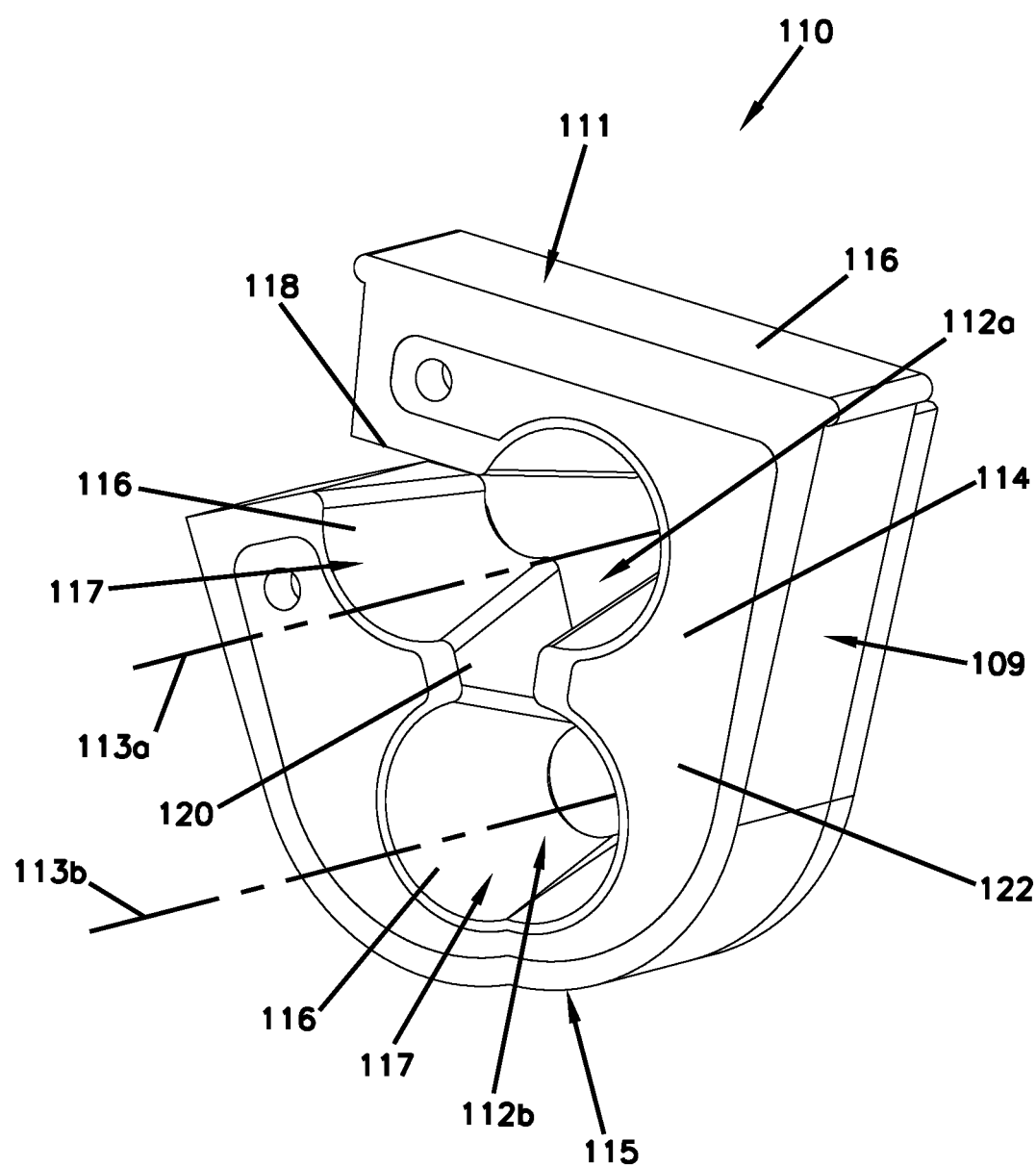
FIG. 3 illustrates a front perspective view of a sealing unit according to one embodiment of the present disclosure.
Figure 4:
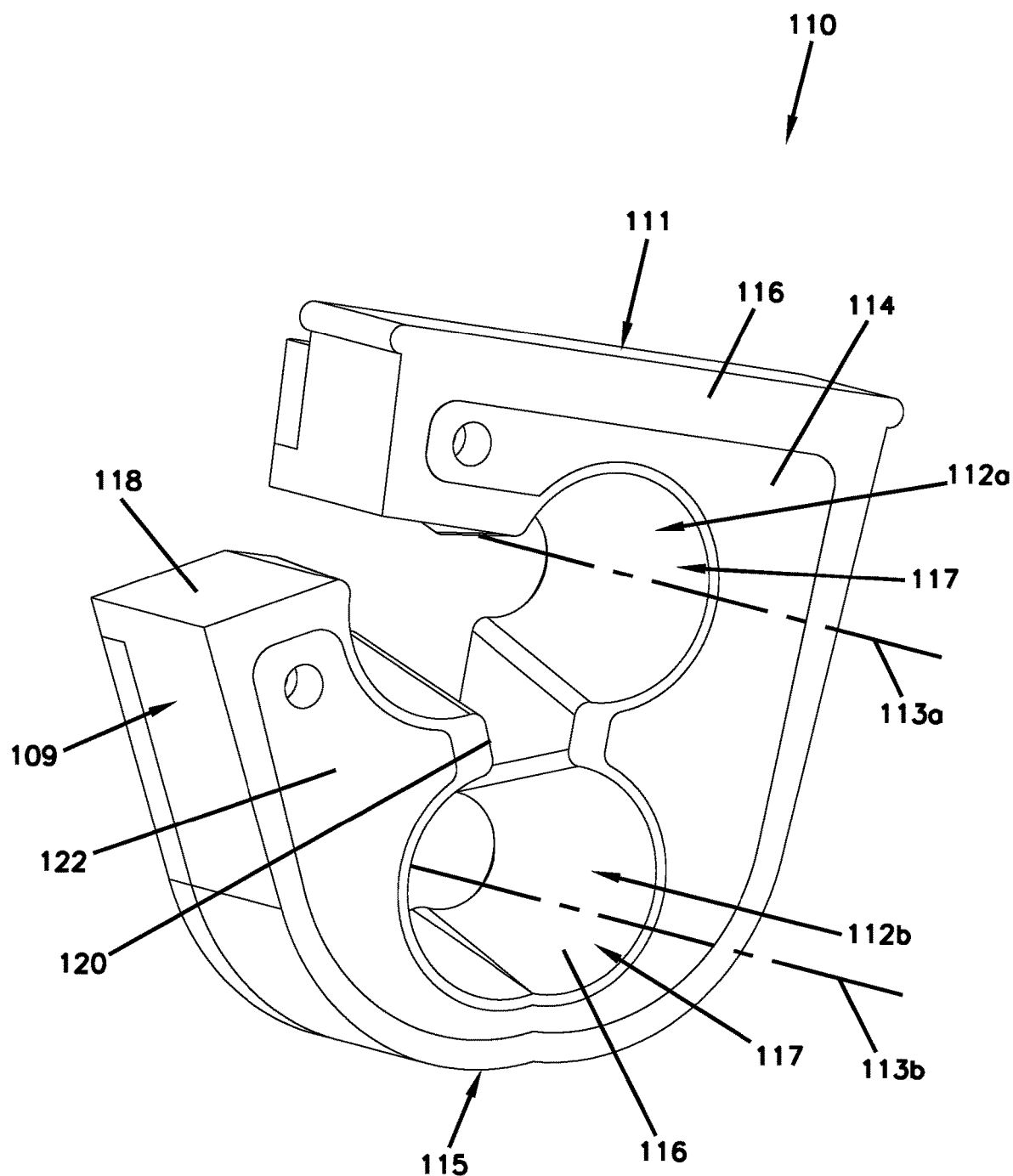
FIG. 4 illustrates a front perspective view of the sealing unit of FIG. 3.
Figure 5:
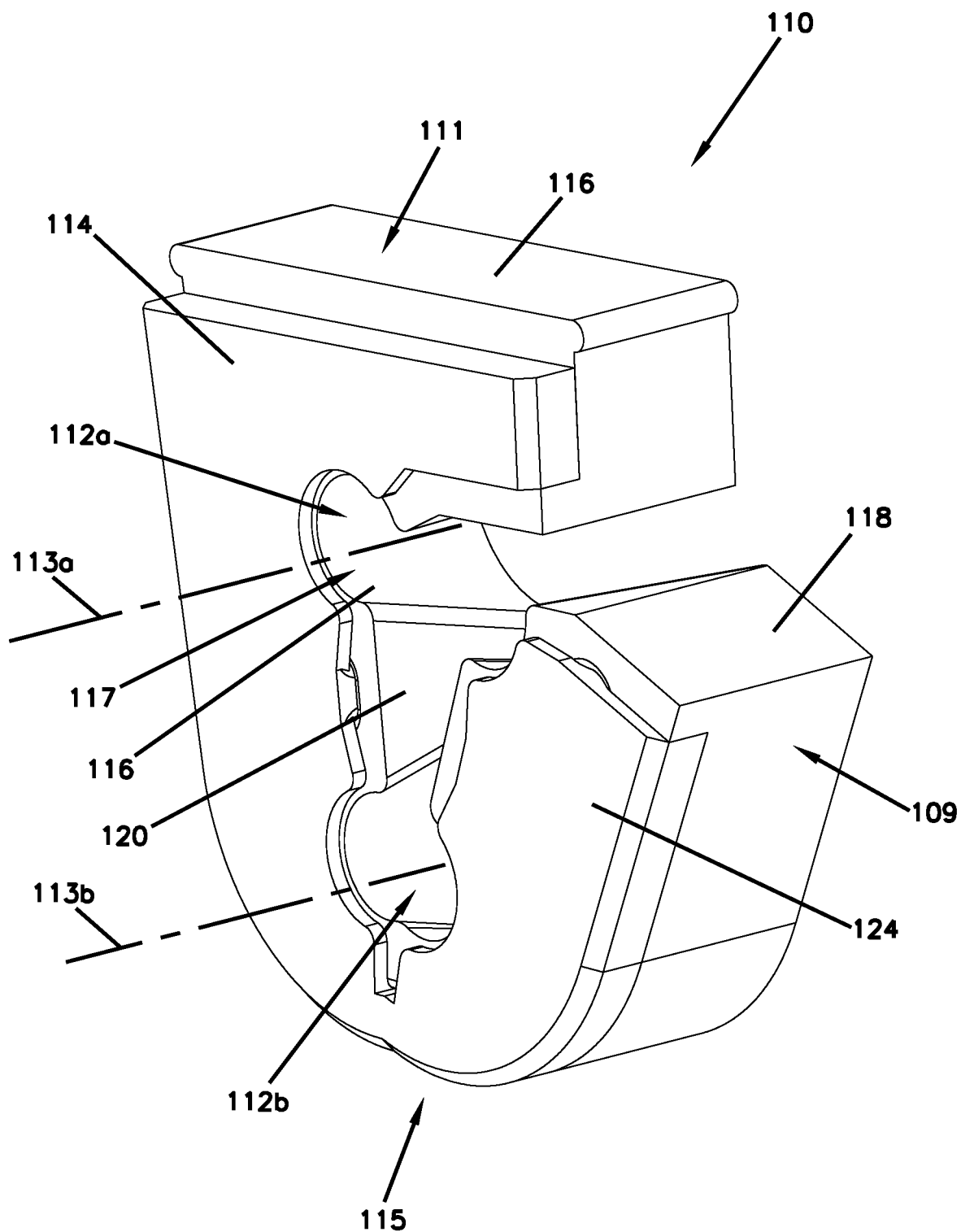
FIG. 5 illustrates a back perspective view of the sealing unit of FIG. 3.
Figure 7:
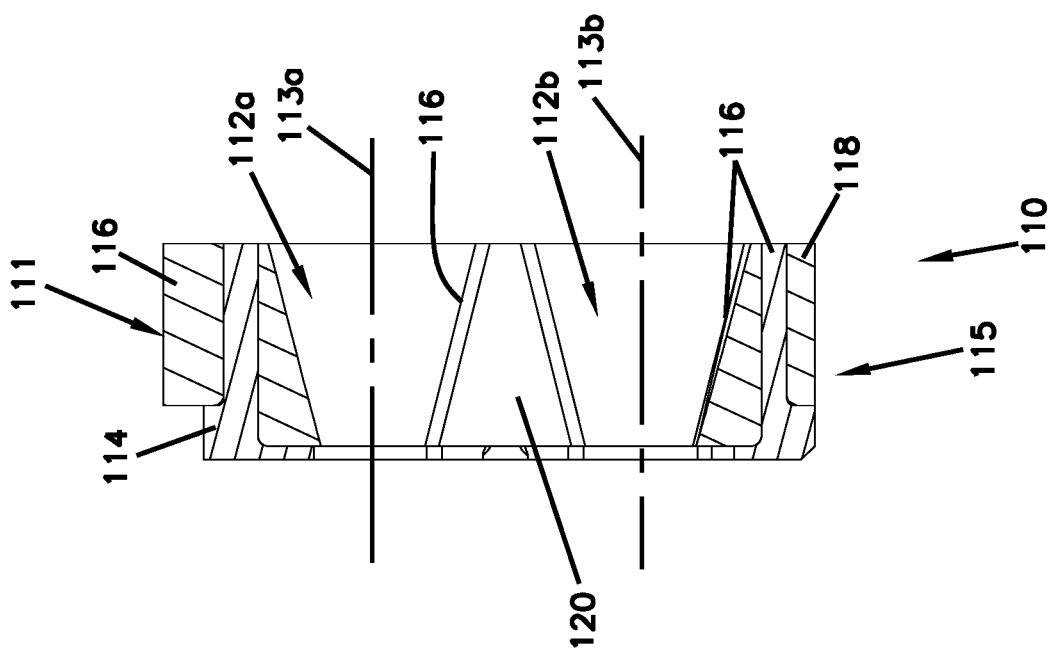
FIG. 7 illustrates a cross-sectional view of the sealing unit of FIG. 3 along line C-C.
Figure 6:
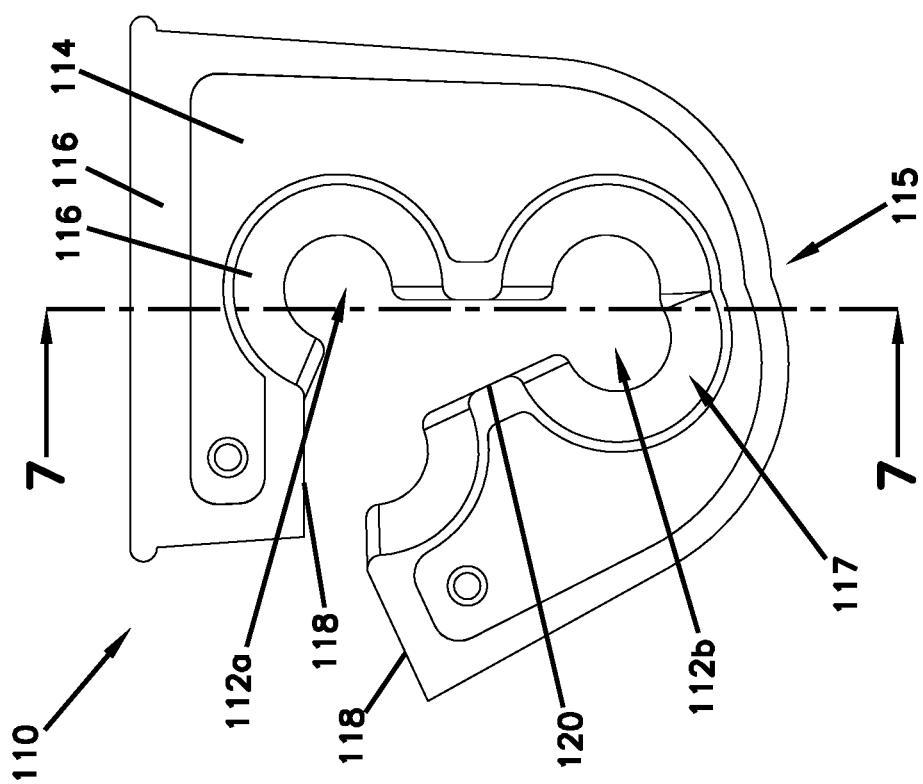
FIG. 6 illustrates a front view of the sealing unit FIG. 3.

FIG. 1 shows a telecommunications enclosure 100 in accordance with the principles of the present disclosure. The enclosure 100 includes a housing 102 having a cover 104 and a base 106, the base defining a plurality of sealing troughs 108. FIG. 2 shows the base 106 of the enclosure 100, with the cover 104 opened, in accordance with the principles of the present disclosure. The enclosure 100 also includes a plurality of sealing units 110 (see FIGS. 3-11) that fit within the sealing troughs 108. Each sealing unit 110 defines a plurality of cable ports 112. When the cover 104 is closed on the base 106 of the enclosure 100, each sealing unit 110 is configured for providing seals about structures (e.g., cables, plugs, etc.) routed though the cable ports 112 and is also configured for providing a peripheral seal between the housing 102 and each sealing unit 110. When cables are used, the cable can be either fiber optic cables or copper cables. In some embodiments, the cables can be main distribution cables and they may loop or pass through the enclosure 100 so that one portion of the cable enters the enclosure 100 through one of the cable ports 112 and another portion of the cable exits the enclosure 100 through the other cable ports 112.

FIGS. 3-7 show a single sealing unit 110 in an open position. As shown, the sealing unit 110 includes a plurality of ports 112a, 112b, a first body 114, and a second body 116. As shown, the second body 116 is disposed on at least a portion of the first body 114. The sealing unit 110 is generally U-shaped so as to mate with a generally U-shaped trough of an enclosure. The sealing unit includes a generally flat top surface 111, generally flat side surfaces 109, and an arcuate shaped bottom surface 115. However, in other embodiments, the sealing unit 110 can be a variety of different shapes to fit within differently shaped troughs.

While a plurality of ports 112 are shown, in other embodiments, the sealing unit 110 includes only a single port 112. In still other embodiments, the sealing unit 110 includes more than two ports. Each port 112a, 112b defines a port axis 113a, 113b. When structures are routed through and within the ports 112a, 112b, the structures, such as a cable, lie along the axes 113a, 113b of the particular port 112a, 112b in which the structure is positioned. In some embodiments, each port 112 includes tapered walls 117. The tapered walls 117 allow the ports 112a, 112b to have an inner diameter at one side that is larger than the inner diameter of an opposite side of the ports 112a, 112b. This tapered wall configuration allows for variety of differently sized structures to be sealed within the ports 112.

In the depicted embodiment, the sealing unit 110 is a wrap-around seal. The wrap-around configuration allows the sealing unit 110 to be wrapped around a structure, such as a cable, during installation to allow for lateral insertion of a structure into the ports 112. This is advantageous if the structure that is to be sealed does not have a terminated end. For example, a cable could be looped with the enclosure 100, stored, and then routed back out of the enclosure 100 without being terminated.

To allow for the wrap-around design, the sealing unit 110 includes a pair of seams 118, 120 that are separable. The first seam 118 provides lateral access to the port 112a from the outside of the sealing unit 110. The second seam 120 provides lateral access to port 112b from port 112a.

Figure 8:
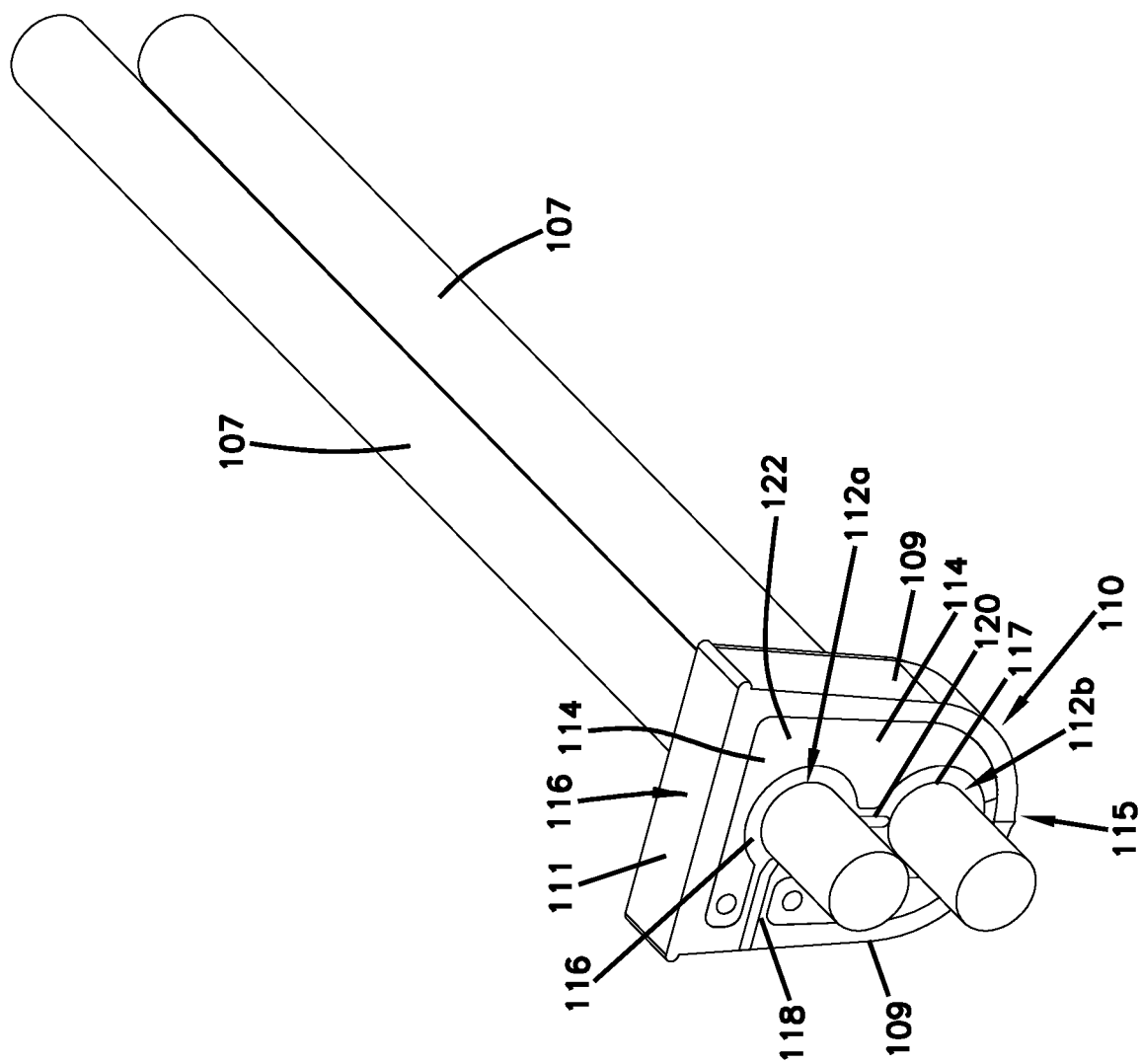
FIG. 8 illustrates a perspective view of the sealing unit of FIG. 3 in a closed position.
Figure 9:
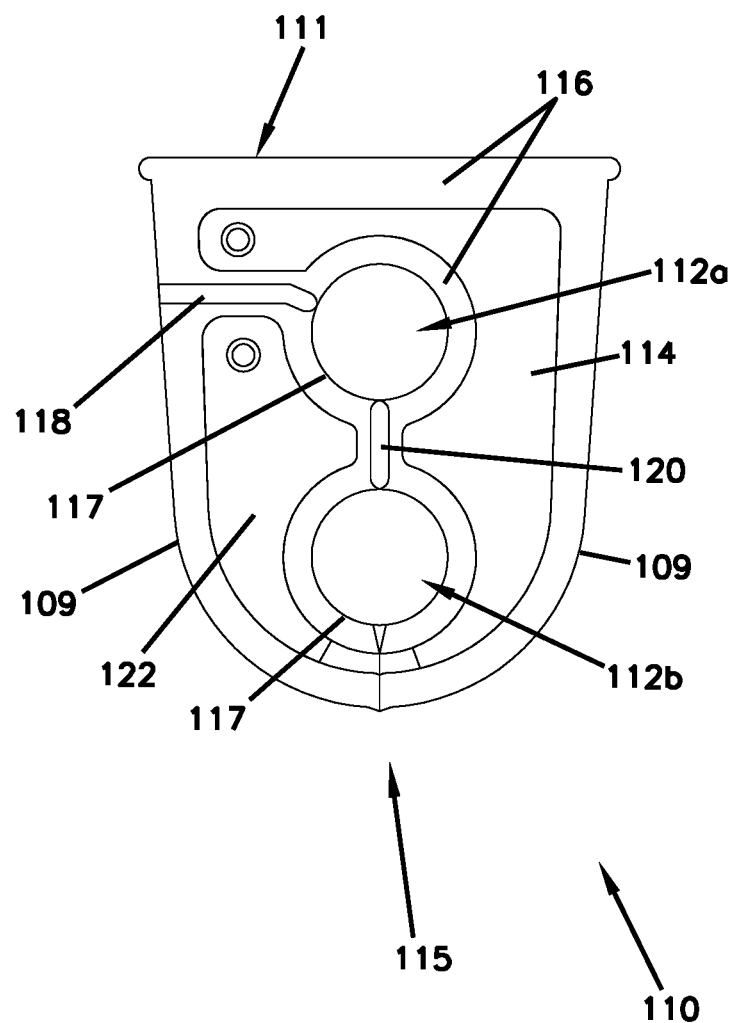
FIG. 9 illustrates a front view of the sealing unit of FIG. 3 in a closed position.

The sealing unit 110 has an open position (shown in FIGS. 3-7) and a closed position (shown in FIGS. 8-9). The sealing unit 110 can be in the open position during installation. When in the open position, both seams 118, 120 are also open, allowing lateral access to the port 112a, 112b. When the sealing unit 110 is in the closed position, the seams 118, 120 are closed providing sealed ports 112a, 112b from each other and from the exterior of the sealing unit 110. As shown in FIG. 8, when in the closed position, the sealing unit 110 forms a seal around a pair of structures 107 that are positioned within the ports 112a, 112b.

Figure 10:
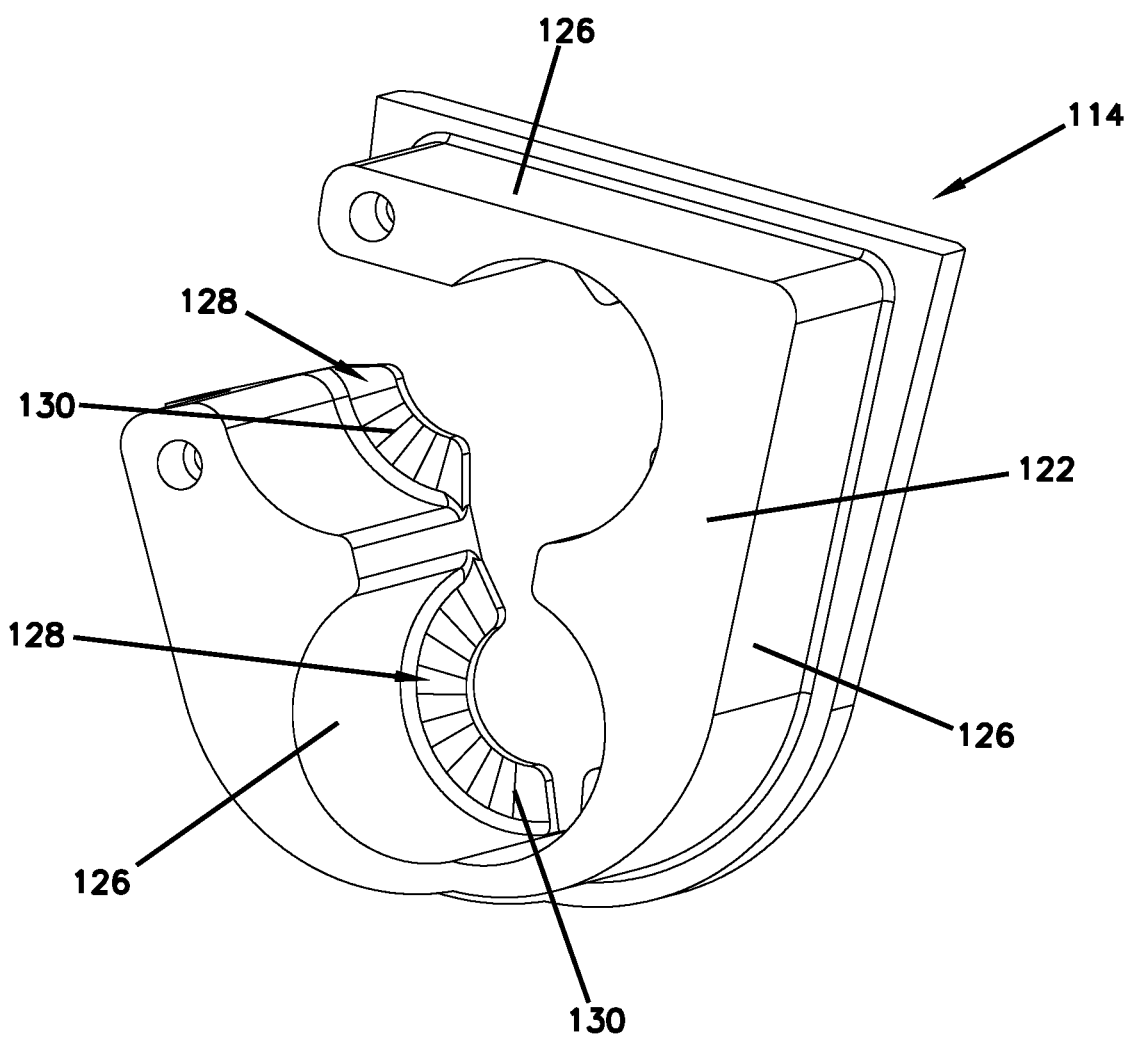
FIG. 10 illustrates a front perspective view of a first body of the sealing unit of FIG. 3.
Figure 11:
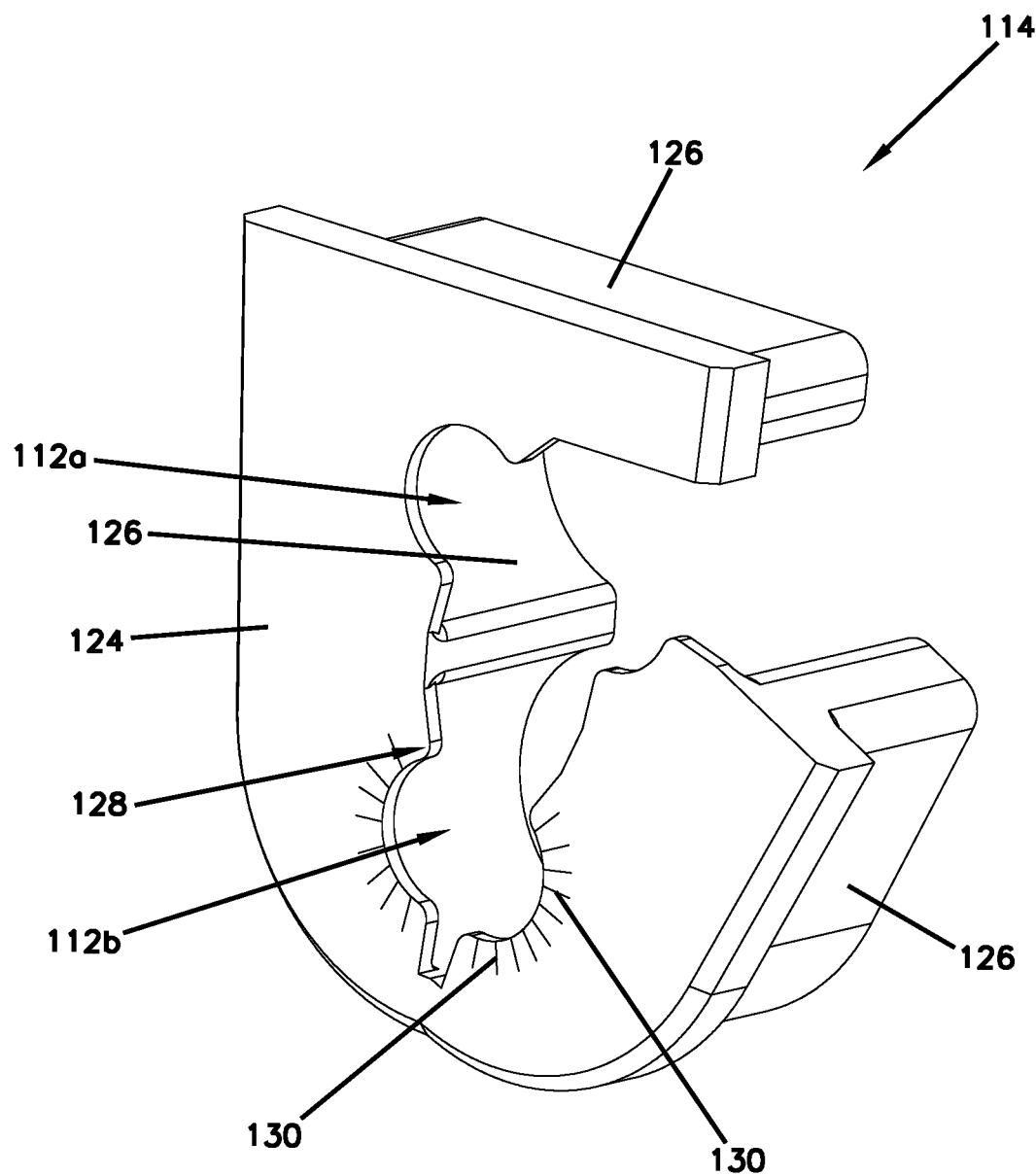
FIG. 11 illustrates a back perspective view of a first body of the sealing unit of FIG. 3.

As shown in FIGS. 10 and 11, the first body 114 of the sealing unit 110 includes first and second axial faces 122, 124. The first axial face 122 being larger than the second axial face 124. The first body 114 further includes a peripheral surface 126 that surrounds the first body 114 between the first and second axial faces 122, 124. The peripheral surface 126 further surrounds and defines the ports 112a, 112b and the seams 118, 120.

In some embodiments, the first body 114 includes a pair of flaps 128 at the second axial face 124 that at least partially cover the ports 112a, 112b. In some embodiments, the flaps 128 can include a plurality of radial slits 130 to allow the flaps 128 to spread out around a structure, such as a cable, that is inserted into the ports 112a, 112b. In some embodiments, the flaps 128 can be arranged in a truncated conical shape.

In some embodiments, the first body 114 is comprised of a resilient, compressible material. By being compressible, the volume of first body 114 changes as the amount of pressure being exerted on the first body 114 changes. In some embodiments, the volume of the first body 114 can shrink when under pressure. In some embodiments, the first body 114 is comprised of a rubber, thermoplastic elastomer, or vulcanized rubber. In some embodiments, the first body 114 is a rubber with a durometer hardness of between about Shore A 10 and about Shore A 70. In some embodiments, the first body 114 has a durometer hardness between about Shore A 20 and about Shore A 60. In some embodiments, the first body 114 has a durometer hardness between about Shore A 20 and about Shore A 50. In some embodiments, the first body 114 has a durometer hardness between about Shore A 20 and about Shore A 40. In some embodiments, the first body 114 has a durometer hardness between about Shore A 20 and about Shore A 30.

The term "rubber" as used herein is intended in its generic sense to denote natural rubber, synthetic rubber, blends thereof, or any suitable elastomeric material. The term "thermoplastic elastomer" refers to an elastomer comprising a thermoreversible network. Thermoplastic elastomers (TPE), sometimes referred to as thermoplastic rubbers, are a class of copolymers or a physical mix of polymers (usually a plastic and a rubber) which consist of materials with both thermoplastic and elastomeric properties. The term "thermoplastic" refers to a polymer that softens when exposed to heat and returns to a more rigid condition when cooled. The term "elastomer" refers to a polymer that displays rubber-like elasticity. Elastomers exhibit viscoelasticity (having both viscosity and elasticity) and very weak inter-molecular forces, generally having low Young's modulus and high failure strain compared with other materials. The term is often used interchangeably with the term rubber, although the latter is preferred when referring to vulcanisates. The term "vulcanization" refers to chemical crosslinking of high molar-mass linear or branched polymers to give a polymer network. The polymer network often displays rubberlike elasticity; however, a high concentration of crosslinks can lead to rigid materials.

Figure 12:
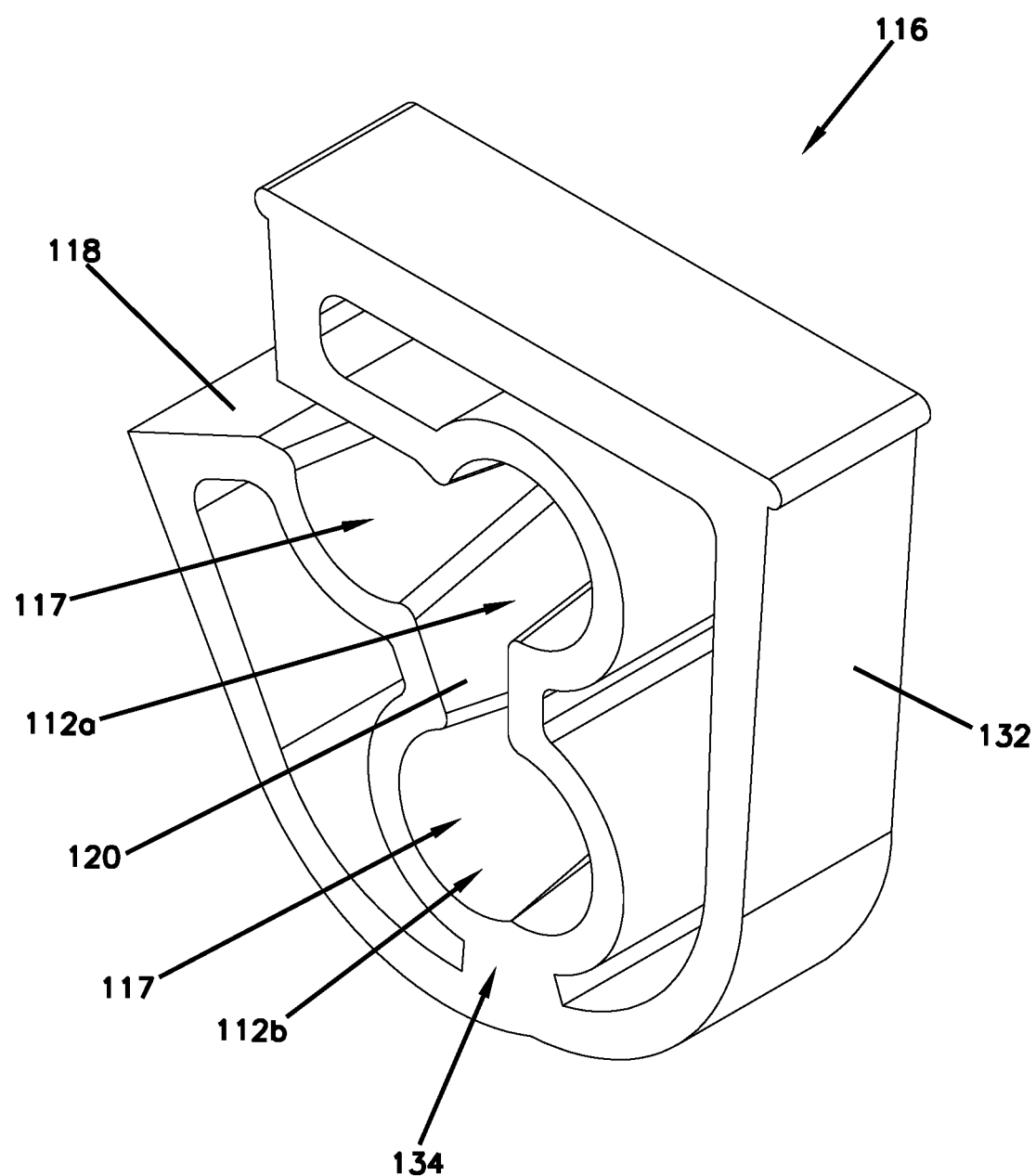
FIG. 12 illustrates a perspective view of a second body of the sealing unit of FIG. 3.
Figure 13:
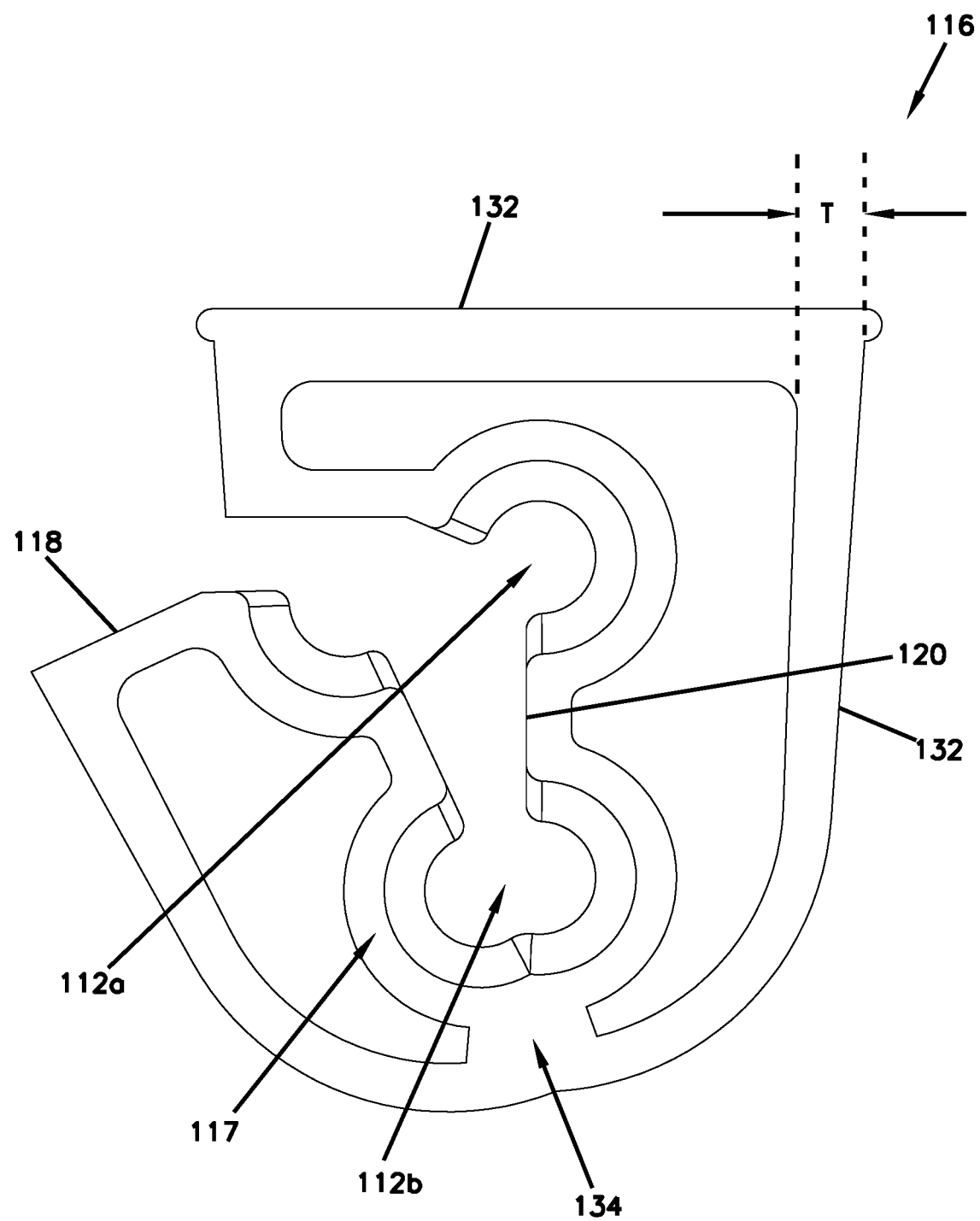
FIG. 13 illustrates a front view of a second body of the sealing unit of FIG. 3.

In FIGS. 12 and 13, the second body 116 of the sealing unit 110 is shown. The second body 116 is configured to be disposed on the peripheral surface 126 of the first body 114. The second body 116 is comprised of a softer material than the first body 114. By being softer than the first body 114, the second body 116 forms a more flexible seal around an exterior 132 of the sealing unit 110. However, in the depicted embodiment, the first and second axial faces 122, 124 of the first body 114 remain substantially exposed and not covered by the second body 116. In the depicted embodiment, the second body 116 includes a hinge region 134. The hinge region 134 allows the sealing unit 110 that has a wrap-around design to more easily move between the open position and the closed position because the material comprising the second body 116 is softer than the first body 114. In some embodiments, the hinge region 134 of the second body 116 can be continuous, traveling from the walls 117 of the port 112*b* to the outer edge of the second body 116. In some examples, the majority of the volume of the hinge region 134 is comprised of the second body 116.

In some embodiments, the second body 116 is comprised of an incompressible material. It will be appreciated that various materials can be used to form the second body 116 element. Example materials include elastomers, including natural or synthetic rubbers (e.g., EPDM rubber or silicone rubber). In other embodiments, polymeric foam (e.g., open cell or closed cell) such as silicone foam can be used. In still other embodiments, the second body 116 may comprise gel and/or gel combined with another material such as an elastomer. The gel may, for example, comprise silicone gel, urea gel, urethane gel, thermoplastic gel, or any suitable gel or geloid sealing material. Gels are normally substantially incompressible when placed under a compressive force and normally flow and conform to their surroundings thereby forming sealed contact with other surfaces. Example gels include oil-extended polymers. The polymer may, for example, comprise an elastomer, or a block copolymer having relatively hard blocks and relatively elastomeric blocks. Example copolymers include styrene-butadiene or styrene-isoprene di-block or tri-block copolymers. In still other embodiments, the polymer of the gel may include one or more styrene-ethylene-propylene-styrene block copolymers. Example extender oils used in example gels may, for example, be hydrocarbon oils (e.g., paraffinic or naphthenic oils or polypropene oils, or mixtures thereof). The second body 116 can also include additives such as moisture scavengers, antioxidants, tackifiers, pigments and/or fungicides. In certain embodiments, the second body 116 can have an ultimate elongation greater than 100 percent with substantially elastic deformation to an elongation of at least 100 percent. In other embodiments, the second body 116 can have an ultimate elongation of at least 200 percent, or at least 500 percent, or at least 1000 percent. Ultimate elongation can be determined by the testing protocol set forth at ASTM D412.

In other embodiments, the second body 116 is comprised of mastic material. The mastic material can be comprised of a variety of different types of materials such as butyl, EPDM, epoxy or silicone mastic. In some embodiments, the second body 116 is comprised of a material that has a tackiness to the touch. In some embodiments, the second body 116 is comprised of a material that is tackier to the touch than the material of the first body 114.

In some embodiments, the second body 116 has a uniform thickness T of less than about 5 millimeters. In some embodiments, the second body 116 has a uniform thickness T of less than 4 millimeters. In some embodiments, the second body 116 has a uniform thickness T of less than 3 millimeters. In some embodiments, the second body 116 has a uniform thickness T of less than 2 millimeters. In some embodiments, the second body 116 has a uniform thickness T of less than 1 millimeter. In some embodiments, the second body 116 has twice the thickness at the seams 118, 120.

In some embodiments, the first body 114 occupies more volume of the total volume of the sealing unit 110 than the second body 116. In some embodiments, the first body 114 comprises at least 50 percent of the total volume of the sealing unit 110. In other embodiments, the first body 114 comprises at least 60 percent of the total volume of the sealing unit 110. In other embodiments, the first body 114 comprises at least 70 percent of the total volume of the sealing unit 110. In other embodiments, the first body 114 comprises at least 80 percent of the total volume of the sealing unit 110. In other embodiments, the first body 114 comprises at least 90 percent of the total volume of the sealing unit 110.

By surrounding the first body 114 with the softer second body 116, the sealing unit 110 creates a multi-component seal capable of effectively sealing a structure to satisfy IP65 standards. Specifically, the sealing unit forms a seal around a structure contained with the ports 112*a*, 112*b* and also a seal with the exterior 132 of the sealing unit 110 and the seal trough 108, cover 104, and base 106 of the enclosure 100 (see FIGS. 1 and 2). When a force is exerted on the sealing unit 110 (e.g., by the cover 104 of the enclosure on the top surface 111), the second body 116, due to its incompressibility, will seek to fill its container, or trough 108, completely. Once the trough 108 is completely filled, the second body 116 will then begin to at least partially compress the first body 114 if continued force is exerted on the second body 116. At this time, the first body 114 exerts a spring force back on the second body 116, thereby helping to create a more complete seal around the exterior 132 of the sealing unit 110 with the seal trough 108, cover 104, and base 106 and also around the structure contained within the ports 112*a*, 112*b*, such as a cable. The spring force exerted on the second body 116 by the first body 114 also helps to maintain the seal even if the second body 116 reduces volume over time due to oil bleed-out or other reason.

To manufacture the sealing unit 110, a variety of different methods may be utilized. In a first example, the sealing unit 110 may be molded. The first body 114 is first individually created by molding, extrusion, or a like process. The preformed first body 114 is then placed into a mold that is shaped like the sealing unit 110. The material that makes up the second body 116 is then injected around the first body 114 and fills the void area in the mold that fully surrounds the first body 114. Due to the continuous configuration of the second body 116, a single injection port can be utilized when injecting the material that makes up the second body 116.

It will be appreciated that the sealing unit 110 of present disclosure can be described in a variety of different ways. For example, the sealing unit can include a main body made of a first material and a liner disposed thereon that is made of a second, softer, material. The liner can include three parts; an outer liner, a port liner, and a seam liner. The outer liner surrounds the outer periphery of the main body. The port liner surrounds the port, or ports. In the case of a circular port, the port liner surrounds the circumference of the port. The seam liner surrounds a seam connecting the outer periphery of the sealing unit with the first port, and the seam liner can also surround a seam connecting the first port with a second port of the sealing unit. In some embodiments, the seam liner extends to provide communication through a first seam between the port liner and the outer liner. In some embodiments, the seam liner extends to provide communication through a second seam to provide communication between first port and a second port of the sealing unit. In one example, the seam liner can have a predefined separation zone at which the second material of the seam liner separates when the seam is opened. In another example, the seam liner can line a single side of a seam and seal with the main body when in a closed position, and separate away from the main body when the seam is in the open position. In some embodiments, the liner can include a hinge portion providing second material communication between the port liner of a second port and the outer liner. In some embodiments, the liner has a uniform thickness of less than about 5 millimeters. In some embodiments, the liner has a uniform thickness of less than about 4 millimeters. In some embodiments, the liner has a uniform thickness of less than about 3 millimeters. In some embodiments, the liner has a uniform thickness of less than about 2 millimeters. In some embodiments, the liner has a uniform thickness of less than about 1 millimeter. In some embodiments, the seam liner has twice the thickness of the uniform thickness of the outer and port liners.

In one aspect of the present disclosure, a seal for a telecommunications enclosure is disclosed. The seal includes a first body made of a first material. The first body defines a port and the port defines a port axis. The first body further includes a first axial face, an opposite second axial face, and a peripheral surface. The peripheral surface surrounds the first body between the first axial face and second axial face and the peripheral surface further surrounds the port. The seal also includes a second body made of a second material. The second body is disposed on at least the peripheral surface of the first body. The second material is softer than the first material of the first body.

Another aspect of the present disclosure, in combination with any of the above aspects, includes a first seam that is configured to allow lateral access to the port when the first seam is in an open position.

Another aspect of the present disclosure, in combination with any of the above aspects, is where the first body further defines a second port and the second port defines a second port axis.

Another aspect of the present disclosure, in combination with any of the above aspects, is where the first and second ports have tapered walls.

Another aspect of the present disclosure, in combination with any of the above aspects, includes a first seam that is configured to allow lateral access to the port when the first seam is in an open position. The seal also includes a second seam that is configured to allow lateral access to the second port when the second seam is in an open position.

Another aspect of the present disclosure, in combination with any of the above aspects, is where the second body is also disposed on the first body at the first and second seams.

Another aspect of the present disclosure in combination with any of the above aspects is where the port has tapered walls.

Another aspect of the present disclosure, in combination with any of the above aspects, is where the first body comprises about 50 percent of the volume of the seal.

Another aspect of the present disclosure, in combination with any of the above aspects, is where the peripheral surface of the first body includes a flat top surface, generally flat side surfaces, and an arcuate shaped bottom surface.

Another aspect of the present disclosure, in combination with any of the above aspects, includes a first seam in the first body connecting the port to a single side surface of the first body.

Another aspect of the present disclosure, in combination with any of the above aspects, is where the second body is disposed on the top, bottom, and side surfaces of the first body. The second body is also deposited on walls of the port.

Another aspect of the present disclosure, in combination with any of the above aspects, is where the material that comprises the first body is a rubber material.

Another aspect of the present disclosure, in combination with any of the above aspects, is where the second material of the second body is incompressible.

Another aspect of the present disclosure, in combination with any of the above aspects, is where the first body is pre-formed and the second body is over-molded so as to surround the first body.

Another aspect of the present disclosure, in combination with any of the above aspects, includes a telecommunications enclosure that includes a trough for receiving the seal.

Another aspect of the present disclosure, in combination with any of the above aspects, is where the first body comprises about 60 percent of the volume of the seal.

Another aspect of the present disclosure, in combination with any of the above aspects, is where the first body comprises about 70 percent of the volume of the seal.

Another aspect of the present disclosure, in combination with any of the above aspects, is where the first body comprises about 80 percent of the volume of the seal.

Another aspect of the present disclosure, in combination with any of the above aspects, is where the first body comprises about 90 percent of the volume of the seal.

Another aspect of the present disclosure, in combination with any of the above aspects, is where the material that comprises the second body is at least one of a gel, mastic, or rubber.

In another aspect of the present disclosure, a seal for a telecommunications enclosure is disclosed. The seal includes a main body having a flat top surface, generally flat side surfaces, and an arcuate shaped bottom surface. The main body is comprised of a first material. The seal includes at least one port passing through the main body. The port has tapered walls. The port also includes a first seam in the main body that connects the port to a single side surface of the main body. The first seam is movable between an open position and a closed position. When in the open position, the first seam allows lateral access to the port. The seal includes a second body comprised of a second material where the second material is softer than the first material. The second body is disposed on the top, bottom, and side surface of the main body. The second body is also deposited on the tapered walls of the port.

Another aspect of the present disclosure, in combination with any of the above aspects, includes a second port passing through the main body. The second port has tapered walls and the second body is deposited on the tapered walls of the second port.

Another aspect of the present disclosure, in combination with any of the above aspects, includes a second seam in the main body connecting the first port to the second port.

Another aspect of the present disclosure, in combination with any of the above aspects, is where the second body is also disposed on the main body at the first and second seams Another aspect of the present disclosure, in combination with any of the above aspects, is where the second body is also disposed on the main body at the first seam.

Another aspect of the present disclosure, in combination with any of the above aspects, is where the first material of the main body is compressible.

Another aspect of the present disclosure, in combination with any of the above aspects, is where the second material of the second body is incompressible.

Another aspect of the present disclosure, in combination with any of the above aspects, includes a telecommunications enclosure that includes a trough for receiving the seal.

In one aspect of the present disclosure, a method of manufacturing a seal for a telecommunications enclosure is disclosed. The method includes pre-molding a first body made of a first material. The first body defines a port and the port defines a port axis. The first body further includes a first axial face, an opposite second axial face, and a peripheral surface. The peripheral surface surrounds the first body between the first axial face and second axial face, and the peripheral surface further surrounds the port. The method also includes over-molding a second body to surround the first body. The second body is made of a second material. The second body is disposed on at least the peripheral surface of the first body. The second material is softer than the first material of the first body.

Another aspect of the present disclosure, in combination with any of the above aspects, is where the over-molding includes injecting the second body around the first body at a single injection location.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

PARTS LIST

100 Telecommunications enclosure
102 Housing
104 Cover
106 Base
107 Structure
108 Sealing trough
109 Flat side surface
110 Sealing unit
111 Flat top surface
112 Cable ports
113 Port axis
114 First body
115 Arcuate shaped bottom surface
116 Second body
117 Tapered walls
118 First seam
120 Second seam
122 First axial face
124 Second axial face
126 Peripheral surface
128 Flaps
130 Radial slits
132 Exterior
134 Hinge region

We claim:

1. A seal for a telecommunications enclosure, the seal comprising:
a first body made of a first material, wherein the first material is an elastomeric material, the first body defining a port, the port defining a port axis, the first body further including a first axial face, an opposite second axial face, and an outer peripheral surface, the peripheral surface surrounding the first body between the first axial face and the second axial face, the peripheral surface further surrounding the port at a port-defining surface, the outer peripheral surface corresponding to an outer profile of the seal and the port-defining surface that surrounds the port; and
a second body made of a second material, the second body being disposed on at least the outer peripheral surface and the port-defining surface of the first body, wherein the second material is softer than the first material of the first body.

2. The seal of claim 1, further comprising a first seam configured to allow lateral access to the port when the first seam is in an open position.

3. The seal of claim 1, wherein the first body further defines a second port, the second port defining a second port axis.

4. The seal of claim 3, wherein the first and second ports have tapered walls.

5. The seal of claim 3, further comprising a first seam configured to allow lateral access to the port when the first seam is in an open position, and a second seam configured to allow lateral access to the second port when the second seam is in an open position.

6. The seal of claim 5, wherein the second body is also disposed on the first body at the first and second seams.

7. The seal of claim 1, wherein the port has tapered walls.

8. The seal of claim 1, wherein the first body comprises about 50 percent of the volume of the seal.

9. The seal of claim 1, wherein the peripheral surface of the first body includes a flat top surface, generally flat side surfaces, and an arcuate shaped bottom surface.

10. The seal of claim 9, further comprising a first seam in the first body connecting the port to a single side surface of the first body.

11. The seal of claim 9, wherein the second body is disposed on the top, bottom, and side surfaces of the first body, wherein the second body is also deposited on walls of the port.

12. The seal of claim 1, wherein the first material of the first body is a rubber material.

13. The seal of claim 1, wherein the second material of the second body is incompressible.

14. The seal of claim 1, wherein the first body is pre-formed and the second body is over-molded so as to surround the first body.

15. The seal of claim 1, further comprising a telecommunications enclosure, wherein the enclosure includes a trough for receiving the seal.

16. A seal for a telecommunications enclosure, the seal comprising:
a main body having an outer peripheral surface including a flat top surface, generally flat side surfaces, and an arcuate shaped bottom surface, the main body being comprised of a first material, wherein the first material is an elastomeric material;
at least one port passing through the main body, the port having tapered walls;
a first seam in the main body connecting the port to a single side surface of the main body, the first seam being movable between an open position and a closed position, wherein, when in the open position, the first seam allows lateral access to the port; and a second body comprised of a second material, the second material being softer than the first material, the second body being disposed on the top, bottom, and side surfaces of the main body, wherein the second body is also deposited on the tapered walls of the port.

17. The seal of claim 16, further comprising a second port passing through the main body, the second port having tapered walls, wherein the second body is deposited on the tapered walls of the second port.

18. The seal of claim 17, further comprising a second seam in the main body connecting the first port to the second port.

19. The seal of claim 18, wherein the second body is also disposed on the main body at the first and second seams.

20. The seal of claim 16, wherein the second body is also disposed on the main body at the first seam.

21. The seal of claim 16, wherein the first material of the main body is compressible.

22. The seal of claim 16, wherein the second material of the second body is incompressible.

23. The seal of claim 16, further comprising a telecommunications enclosure, wherein the enclosure includes a trough for receiving the seal.

\* \* \* \* \*